United States Patent [19]

Honda

[11] Patent Number: 4,857,956
[45] Date of Patent: Aug. 15, 1989

[54] COPIER WITH RECIPROCATING DOCUMENT TABLE

[75] Inventor: Iwakazu Honda, Nara, Japan

[73] Assignee: Sharp Kabushiki Kaisha, Osaka, Japan

[21] Appl. No.: 114,071

[22] Filed: Oct. 27, 1987

[30] Foreign Application Priority Data

Oct. 28, 1986 [JP] Japan .................................. 61-257171
Nov. 21, 1986 [JP] Japan ............................ 61-180037[U]

[51] Int. Cl.$^4$ .......................................... G03G 15/04
[52] U.S. Cl. ..................................... 355/234; 355/75; 355/236
[58] Field of Search ...................... 355/8, 50, 75, 113, 355/116, 117, 118

[56] References Cited

U.S. PATENT DOCUMENTS

| | | | |
|---|---|---|---|
| 3,554,640 | 1/1971 | Hoskins | 355/8 |
| 3,635,555 | 1/1972 | Kurahashi et al. | 355/75 X |
| 3,741,646 | 6/1973 | Knechtel et al. | 355/50 |
| 4,030,826 | 6/1977 | Sangster | 355/117 X |
| 4,561,774 | 12/1985 | Takahashi et al. | 355/75 |
| 4,623,938 | 11/1986 | Asano et al. | 355/75 X |
| 4,749,872 | 6/1988 | Asada et al. | 355/75 X |

*Primary Examiner*—Fred L. Braun
*Attorney, Agent, or Firm*—Flehr, Hohbach, Test, Albritton & Herbert

[57] ABSTRACT

A compact image reading apparatus such as a copier has a document table which can move reciprocatingly with respect to the top surface of its housing. A spiral spring is attached to the document table and as the user manually moves the document table from its initial position to a starting position for its operation, the spiral spring is wound up and stores energy as internal elastic energy. When the user releases the table, the spring releases its stored energy and the table moves across the top surface of the housing to effect the scan of a document set on the table.

14 Claims, 8 Drawing Sheets

COPIER WITH RECIPROCATING DOCUMENT TABLE

BACKGROUND OF THE INVENTION

This invention relates to an image reading apparatus such as a copier of the type provided with a document table which moves reciprocatingly over the top surface of its housing to have an original document scanned for processing.

It has been known in designing a small copier to eliminate the space which would be necessary for the motion of its optical system by providing a document table movable reciprocatingly over the top surface of its housing while keeping its optical system fixed. To move such a document table, use is generally made of the same motor which also drives the photosensitive body, the system for transporting copy paper sheets, etc. and the power from such a motor is transmitted through clutches and gears attached to the table. Since the document table of a copier of this type must generally be moved back and forth reciprocatingly with respect to the housing, the rotary motion of the motor must be inverted according to an appropriate timing schedule to be communicated to the document table. For this reason, the power-communicating system for such an apparatus requires a large number of gears, clutches, solenoids, etc., and, as a result, the apparatus tends to become large and more expensive to manufacture.

SUMMARY OF THE INVENTION

It is therefore an object of the present invention to provide an economically manufacturable image reading apparatus such as a small copier of the type having a reciprocating document table.

It is another object of the present invention to provide such an apparatus of a simple structure capable of scanning a document without using a motor or requiring input of electrical power.

It is a further object of the present invention to provide an apparatus as described above of which the document table is adapted to move in one direction by the energy which is accumulated while the table is moved in the opposite direction.

The above and other objects of the present invention are achieved by providing a copier with a reciprocating document table and an elastic member which stores a part of the energy expended in moving the document table from its end position to its starting position for exposure of the document to light and uses this stored energy to drive the table from the starting position to the end position and a damper which causes the elastic member to move the table at a constant speed. With a copier thus structured, a part of the energy expended in moving the table from the end position to the starting position for exposure becomes stored in the elastic member in the form of internal elastic energy but this stored energy is gradually expended in moving the table back from the starting position to the end position while the document on the table is exposed to light. Since the damper is provided, the table executes this trip at a constant speed.

The present invention also discloses an image reading apparatus such as a copier further provided with a sensor for outputting a detection signal if it detects that the document table has been manually moved by a specified distance from its home position. With an apparatus according to this embodiment of the present invention, power is switched on when the table has been moved from its home position by this specified distance and the original document on the table is scanned after the table is released and returns to the home position.

BRIEF DESCRIPTION OF THE DRAWINGS

The accompanying drawings which are incorporated in and form a part of this specification illustrate embodiments of the present invention and, together with the description, serve to explain the principles of the invention. In the drawings.

DETAILED DESCRIPTION OF THE INVENTION

Figure 1:
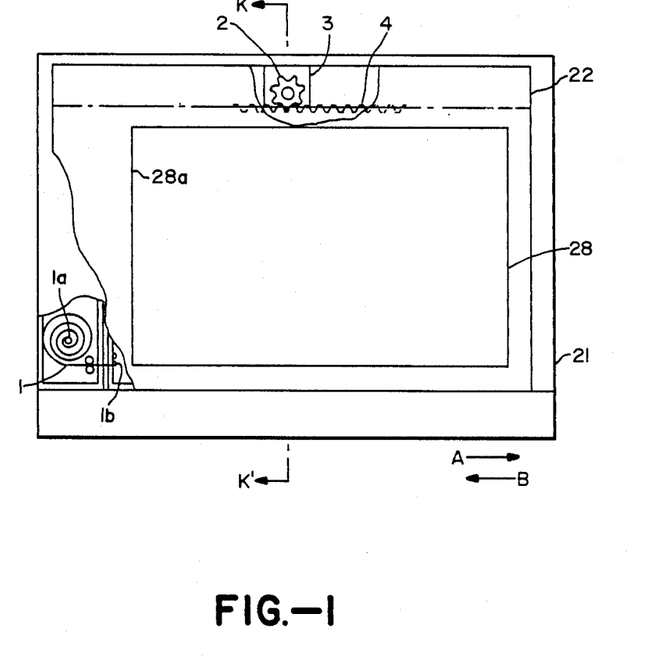
FIG. 1 is a partially broken plan view of a copier with a reciprocating document table embodying the present invention.
Figure 2:
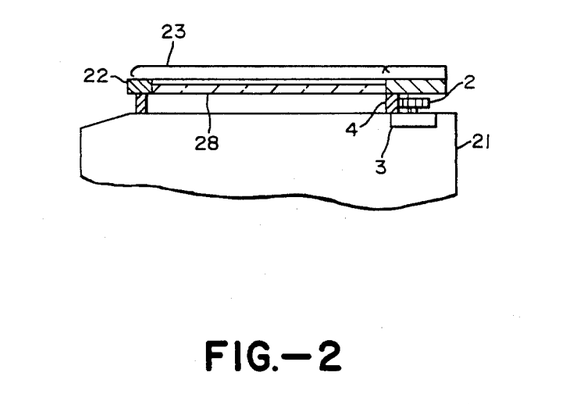
FIG. 2 is a schematic sectional view of a part of the copier of FIG. 1 near its document table taken along the line K—K' of FIG. 1.
Figure 3:
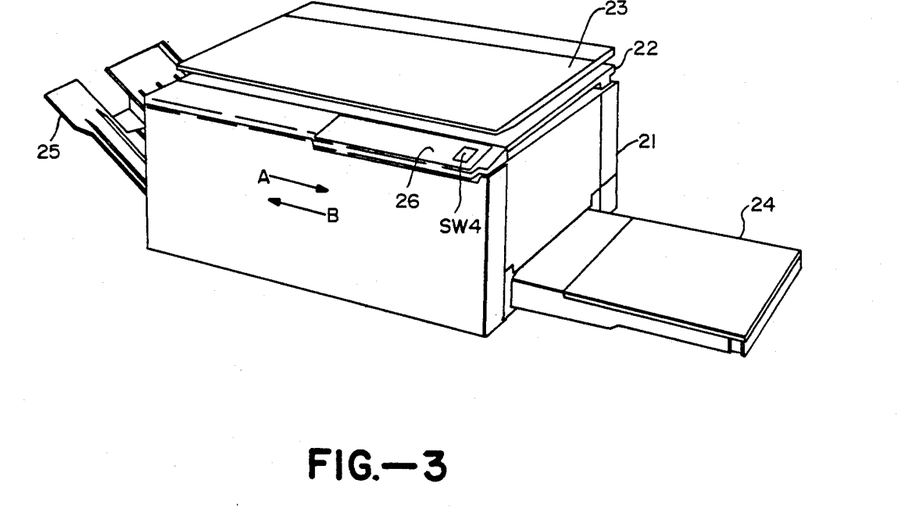
FIG. 3 is a perspective view of the copies of FIG. 1.

With reference to FIG. 3 which is a perspective view of a copier embodying the present invention having a reciprocating document table 22, a paper cassette 24 for stacking sheets of copy paper therein is disposed on a side surface of its housing 21 and the copy paper is delivered one sheet at a time from the cassette 24 to a processing position, the processed paper being thereafter discharged into a tray 25. On the upper surface of the housing 21, there is a control panel 26 provided with a print switch SW4, etc. The document table 22 is adapted to move on rails (not shown) reciprocatingly in the directions of the arrows A and B as shown also in FIGS. 1 and 2 such that a document cover 23 can be freely opened and closed thereabove. The document table 22 is comprised mainly of a supporting plate 28 of transparent hard glass. Near the top surface of the housing 21 is a spiral spring 1 (as an example of an elastic member) with its end 1a at the center of the spiral affixed to the housing 21 and the other end 1b affixed to the document table 22. A rack gear (a notched bar) 4 is affixed to the lower surface of the document table 22 along the entire length of its motion. Correspondingly, a pinion 2 is rotatably supported by the upper surface of the housing 21 through a damper 3 so as to engage with the rack gear 4.

Figure 4:
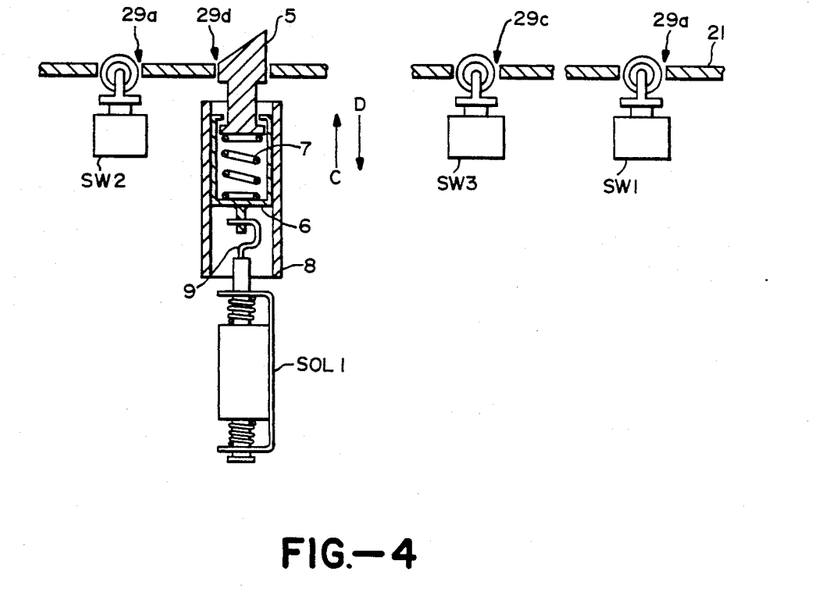
FIG. 4 is a front sectional view of a part of the copier of FIGS. 1 and 3.

As shown in FIG. 4, the upper surface of the housing 21 is provided with openings 29a–29d through which microswitches SW1, SW2 and SW3 and a stopper 5 protrude upward, respectively. Each of these microswitches is provided with an actuator in the form of a roller and is adapted to be switched on if the associated actuator roller is pressed down from above and ceases to protrude above the upper surface of the housing 21 by moving in the direction of the arrow D. The stopper 5 is disposed inside a tubular cylinder 6 such that it can move therein in the directions of the arrows C and D and its bottom surface is in contact with a cylindrical coil spring 7 inside the cylinder 6. The cylinder 6 itself is movable up and down in the directions of the arrows C and D inside a guide member 8 and an actuator 9 of a solenoid SOL1 is affixed to the bottom surface of the cylinder 6. The guide member 8 and the solenoid SOL1 are affixed to the housing 21. The cylinder 6 is adapted to move in the direction of the arrow D if the solenoid SOL1 is activated. If the cylinder 6 moves in the direction of the arrow D, the stopper 5 also moves in the same direction and ceases to protrude above the upper surface of the housing 21.

Figure 5:
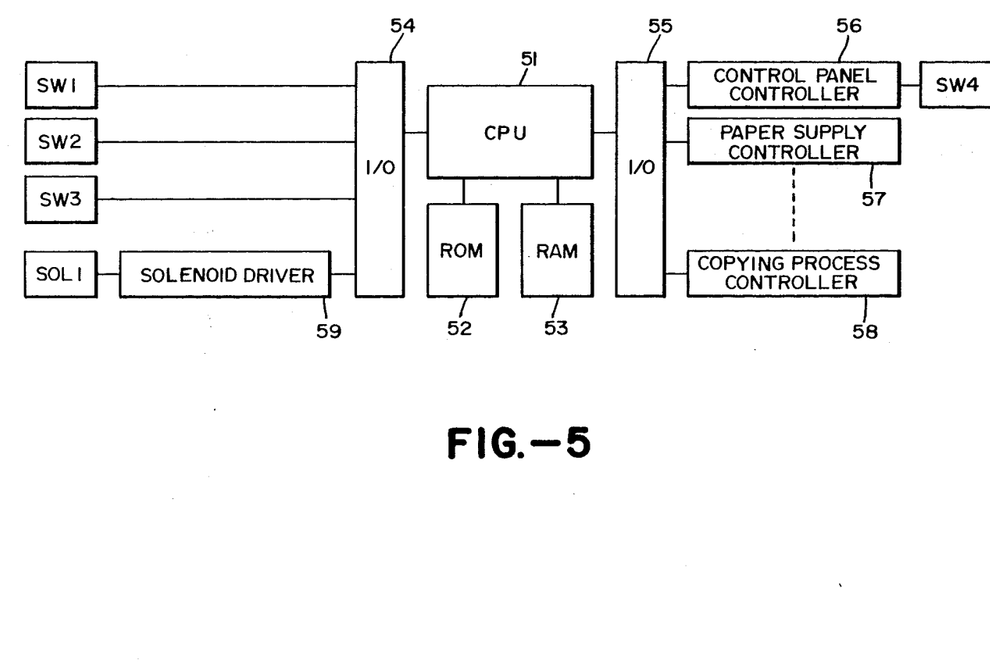
FIG. 5 is a block diagram of the control section of the copier of FIGS. 1 and 3.

With reference to FIG. 5, a central processing unit CPU 51 which controls the overall operation of the copier described above outputs control data to a control panel controller 56, a paper supply controller 57, a processing controller 58, etc., through an I/O interface 55 according to a program stored in a read-only memory ROM 52. Data from the microswitches SW1–SW3 (when they are activated) are received by the CPU 51 through another I/O interface 54. Data from the print switch SW4 (when it is operated) are received from the control panel controller 56 through the interface 55. Data inputted through numeric keys and other control keys (not shown) on the control panel 26 are similarly transmitted from the control panel controller 56 to the CPU 51 and stored as copying data in the random-access memory (RAM) 53. The CPU 51 also outputs control data to a solenoid driver 59 according to the data received from the microswitches SW1 and SW2. The solenoid driver 59 operates the solenoid SOL1 according to these control data.

Figure 6:
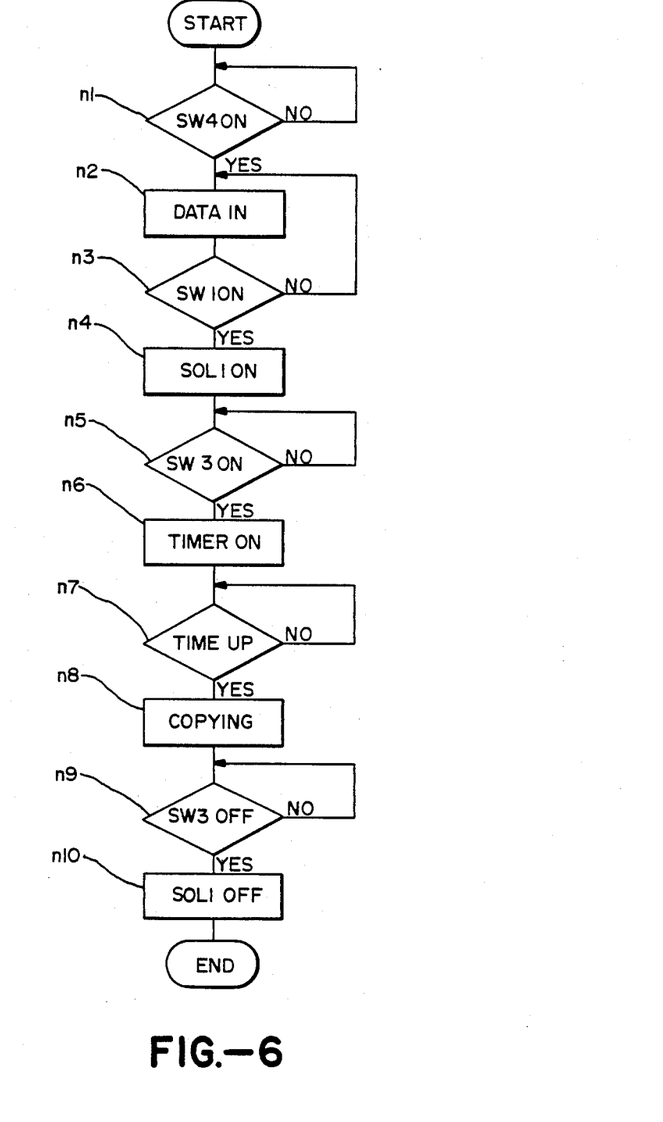
FIG. 6 is a flow chart of the operation of the copier of FIGS. 1 and 3, FIGS. 7A, 7B, and 7C are schematic front sectional views of the copier of FIGS. 1 and 3 for showing the operation of its document table.
Figure 7A:
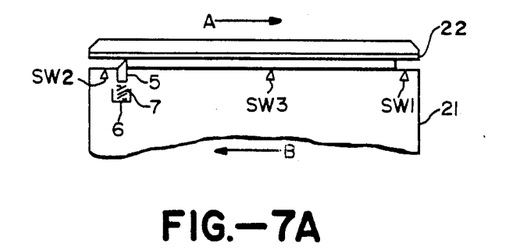

Next, the operation of the copier described above is explained with reference concurrently to FIGS. 6 and 7. FIG. 7A describes schematically the condition of the document table 22 before a copying process is started. In this initial condition, the spiral spring 1 is wound only partially and exerts its elastic force on the document table 22 in the direction of the arrow B. Since the document table 22 is in contact with the stopper 5 underneath, however, it is not free to move in this direction. When an original document to be copied is set on the document supporting plate 28 and the print switch SW4 is operated (n1), the CPU 51 waits for various data to be inputted by the operator (n2) until the first microswitch SW1 is activated (switched on) (n3).

If the operator manually moves the document table 22 in the direction of the arrow A from the stationary condition shown in FIG. 7A and the first microswitch SW1 is switch on (YES in n3), the CPU 51 activates the solenoid SOL1 (n4) to move the cylinder 6 in the direction of the arrow D shown in FIG. 4 and the stopper 5 ceases to protrude above the upper surface of the housing 21. When the document table 22 reaches the position shown in FIG. 7B where exposure to light can be started, the third microswitch SW3 is switched off (n5) and a timer (not shown) is activated (n6). After a predetermined time period has passed (YES in n7), copying operation is carried out (n8). As the document table 22 is manually moved from the initial stationary condition of FIG. 7A to the position of FIG. 7B, the spiral spring 1 is further tightly wound up.

Figure 7B:
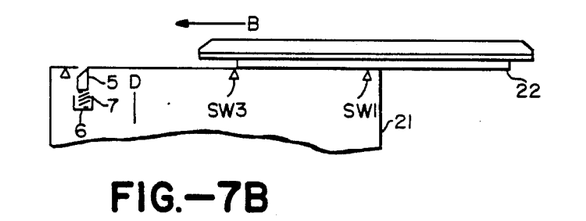
Figure 8:
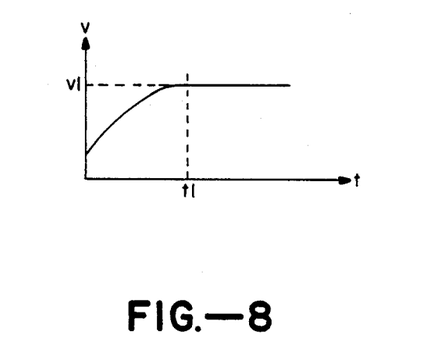
FIG. 8 is a graph showing the relationship between the velocity of the translational motion of the document table of the copier of FIGS. 1 and 3.

If the operator releases the document table 22 from its wound-up condition shown in FIG. 7B, the document table 22 moves in the direction of the arrow B by the elastic force of the spiral spring 1. The damper 3 in this case serves to prevent the speed of the document table 22 from exceeding a certain maximum value. FIG. 8 shows a typical manner in which the speed v of the document table 22 changes with time. The time length $t_1$ necessary for the document table 22 in this situation to reach its final constant speed $v_1$ is measured by the timer T and the copier is so adjusted that a reference position 28a defined on the document supporting plate 28 reaches the exposure position of the copier's optical system (not shown) when a time interval of $t_1$ has passed after the microswitch SW3 is switched on. Since the stopper 5 is not protruding above the upper surface of the housing 21 in this situation, the document table 22 is not prevented from moving in the direction of the arrow B.

Figure 7C:
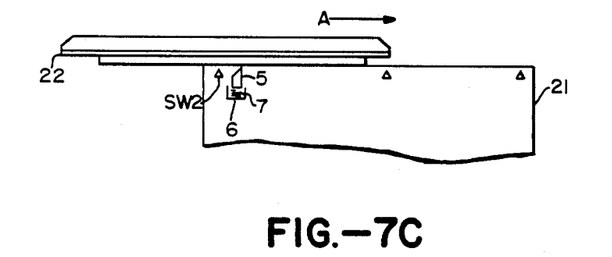

When the document table 22 continues thus to move in the direction of the arrow B and reaches the position shown in FIG. 7C, the spiral spring 1 has expended all of its internal energy stored in the form of elastic energy and the document table 22 stops. FIG. 7C shows the document table 22 at the end position of exposure. While the document table 22 moves from the starting position of exposure shown in FIG. 7B to the end position shown in FIG. 7C, the lower surface of the document table 22 is in contact with the microswitch SW3 and if the microswitch SW3 is activated (n9), this causes the solenoid SOL1 to be switched off (n10) and the cylinder 6 is pushed in the direction of the arrow C. If the document table 22 is at the end position of exposure shown in FIG. 7C, however, the stopper 5 strikes the bottom surface of the document table 22 and cannot protrude above the top surface of the housing 21. After a copying process is completed and the operator manually moves the document table 22 from the end position of exposure shown in FIG. 7C in the direction of the arrow A toward the initial stationary position shown in FIG. 7A, the top end of the stopper 5 is enabled to protrude above the top surface of the housing 21. In the meantime, the spiral spring 1 gains elastic energy by storing a part of the energy expended thereon in moving from the end position of FIG. 7C to the initial stationary position of FIG. 7A but the document table 22 is prevented from moving in the direction of the arrow B because the stopper 5 is now in contact with its bottom surface.

In summary, a part of the energy received by the document table 22 when the operator manually moves it from the end position to the starting position for exposure is stored internally by an elastic member in the form of elastic energy and this stored energy is supplied to the document table to move it during the subsequent exposure process. As a result, the copier does not require any motor or any means for transmitting energy from a power source to execute the reciprocating motion of its document table, and a copier of simple structure can thus be realized.

Figure 9:
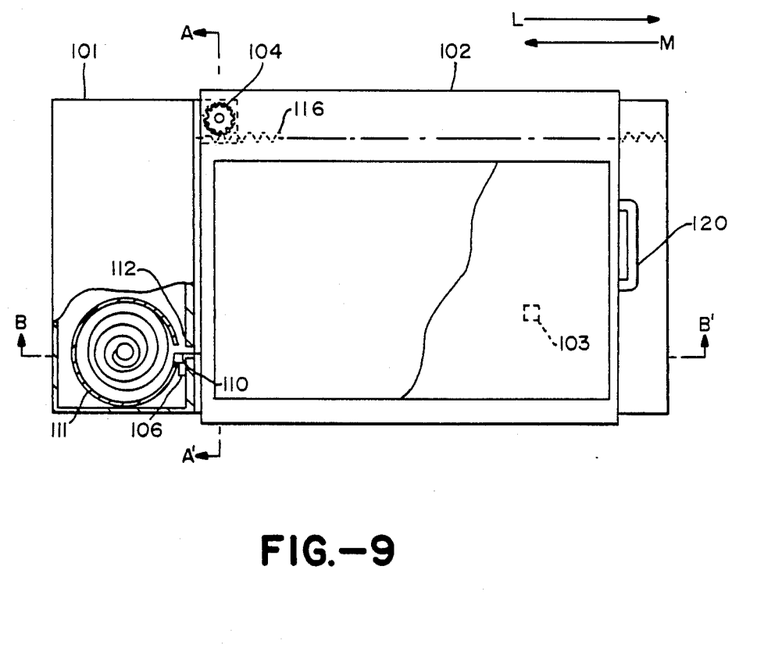
FIG. 9 is a partially broken plan view of another image reading apparatus embodying the present invention.

An image reading apparatus such as a copier according to another embodiment of the present invention is described next by way of FIGS. 9, 10 and 11 as being comprised of a housing 101 and a document table 102 adapted to reciprocatingly move in the directions of the arrows L and M on the upper surface 101b of the housing 101. As shown in FIGS. 9 and 11, the housing 101 is provided with a box-shaped case 101a enclosing a spiral spring 110 which is contained inside a container 111 and serves as a means for applying a restoring force on the document table 102 to return it to its home position. The container 111 is affixed through a vertical axis 111a to the floor and the ceiling of the case 101a above and below the container 111. One end of the spiral spring 110 is pulled out of the case 101a through a slit 112 and is attached to the side surface of the document table 102 opposite to the case 101a. On the internal surface of the side wall of the case 101a having the slit 112, a photosensor 106 is provided adjacent to the spring 110.

Figure 10:
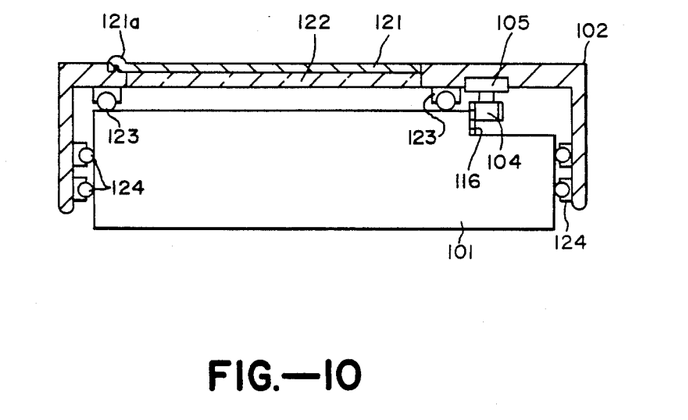
FIG. 10 is a sectional view taken along the line A—A' of FIG. 9.
Figure 11:
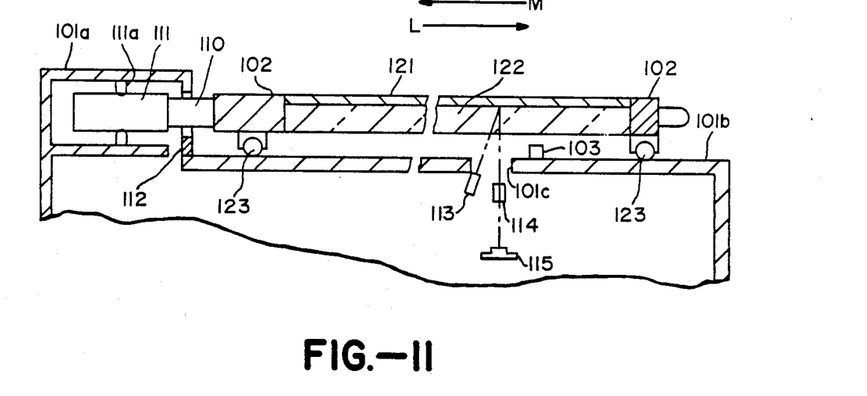
FIG. 11 is a sectional view taken along the line B—B' of FIG. 9.
Figure 12:
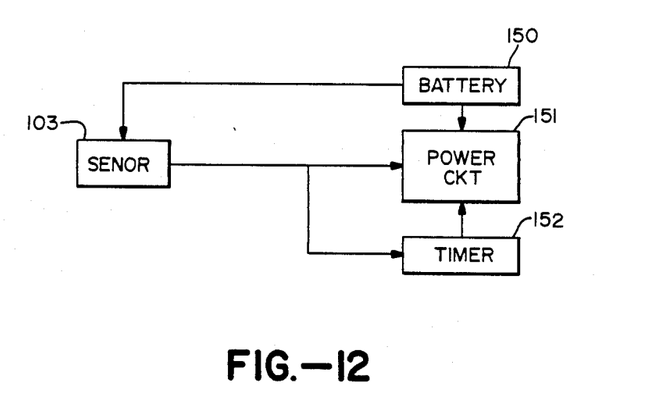
FIG. 12 is a block diagram of the power control section of the apparatus of FIG. 9.

The top surface of the housing 101 is provided with a lower step as best shown in FIG. 10 and a rack 116 is formed on the vertical wall of this step in the direction of motion of the document table 102, that is, the direction shown by the arrows L and M. As shown in FIG. 11, the top surface 101b of the housing 101 is provided with a slit 101c in the direction perpendicular to the arrows L and M and a light emitting diode (LED) array 113 serving as the light source, a light converging medium 114, and a one-dimensional CCD sensor 115 are disposed below and in the longitudinal direction of this slit 101c. When an original document placed on the document table 102 is scanned for processing, it is exposed to light emitted from the LED 113 and the reflected light therefrom is received through the converging medium 114 by the sensor 115. In FIGS. 9 and 11, numeral 103 indicates another photosensor disposed adjacent to the slit 101c. This sensor 103 is for transmitting an ON signal to activate a power circuit (not shown) upon detecting that the document table 102 has been moved manually by a specified length in the direction of the arrow L from its composition shown in FIG. 9.

Cross-sectionally, the document table 102 is U-shaped as shown in FIG. 10 and its central part is made of a hard transparent material 122 such as glass above which is disposed a document cover 121 provided with a hinge 121a. Bearings 123 and 124 are provided on the inner surface of the document table 122 as shown in FIGS. 10 and 11 such that the document table 122 can freely slide over the surface 101b in the directions of the arrows L and M. A pinion 104 engaging with the rack 116 is further provided as shown in FIGS. 9 and 10 on the inner surface of the document table 102 opposite to the upper surface of the housing unit 101. The axis of rotation of this pinion 104 is rotatably supported by a damper 105 which is attached to the document table 102 and serves to allow the pinion 104 to rotate at a constant rate.

Numeral 120 in FIG. 9 indicates a handle by which the operator can conveniently pull the document table 102 in the direction of the arrow L. When the document table 102 is thus moved from its home position to reach a ready position, the sensor 103 is activated by the light reflected by a reflector plate (not shown) attached to the document table 102 to indicate the position of the front edge of a document. The sensor 103 transmits an ON signal when activated, as explained above, to switch on the power circuit and the original document on the document table 102 becomes ready to be scanned. When the operator releases the handle 102, the restoring force of the spiral spring 110 pulls the document table 102 in the direction of the arrow M back to its home position. During this return trip, the damper 105 serves to keep the rotation of the pinion 104 at a constant rate and hence the scanning speed of the document is constant.

The power source control unit of the apparatus described above by way of FIGS. 9, 10 and 11 is comprised of a battery 150 and a timer 152 in addition to the aforementioned power circuit 151 and the photosensor 103. The battery 150 serves to supply a constant voltage to the photosensor 103 such that the sensor 103 is always ready to detect a reflected beam of light and to thereby transmit an ON signal. The source circuit 151 provides power to the entire document reading apparatus and is activated by the ON signal from the photosensor 103. The timer 152 is adapted to start measuring time when the photosensor 103 is activated and to switch it off after a specified length of time.

Figure 13:
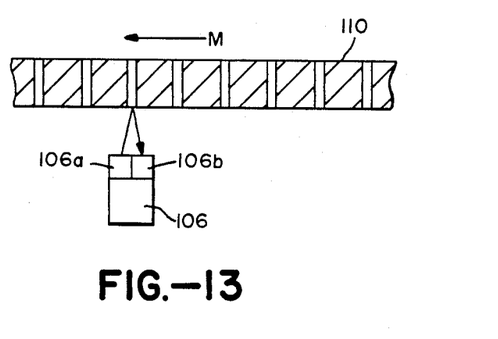
FIG. 13 is a schematic drawing showing the pulse generation unit of the apparatus of FIG. 9.
Figure 14:
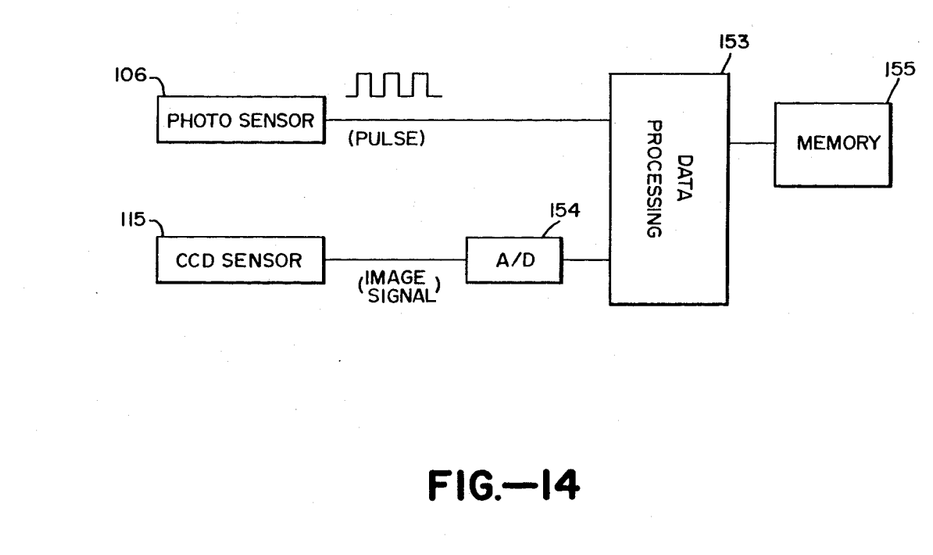
FIG. 14 is a block diagram of the data processing unit for the apparatus of FIG. 9.

The spiral spring 110 and the photosensor 106 shown in FIG. 9 form a pulse generator. As shown more in detail in FIG. 13, one of the side surfaces of the spiral spring 110 is coated with a black coating material at fixed intervals along the direction of its motion. The photosensor 106 comprises a light source 106a and a light-receiving element 106b disposed adjacent to each other, both facing this coated surface of the spiral spring 110. When the document table 102 returns to its home position and the spiral spring 110 moves in the direction of the arrow M, light from the source 106a is reflected from the areas of the spiral spring 110 which are not black-coated. As the reflected light from the spiral spring 110 is sequentially detected by the light-receiving element 106b a pulse signal in synchronism with the translational motion of the spiral spring 110 (representing the scanning speed of the document) is generated and transmitted to a scan control section of the apparatus which is comprised, as shown in FIG. 14, of a data processing unit 153, an analog-to-digital converter 154 and an image memory 155. Image signal from the one-dimensional CD sensor 115 shown in FIG. 11 is converted into a binary signal by the analog-to-digital converter 154 and received by the processing unit 153 together with the aforementioned pulse signal generated by the photosensor 106 as explained above by way of FIG. 13. The binary image data are processed by the data processing unit 153 and stored in the image memory 155 at the intervals of the pulse signal.

In summary, this apparatus also enjoys the advantage of having a document table which the operator has only to move manually by a specified distance and then to release it. The document table thereupon returns to its home position by the elastic force of the spiral spring and does not require a motor for this motion. Moreover, this apparatus is easy to operate since power is switched on automatically in response to a signal from a photosensor and switched off automatically after a fixed time interval.

The foregoing description of the embodiments of the invention has been presented for purposes of illustration and description. It is not intended to be exhaustive or to limit the invention to the precise form disclosed, and many modifications and variations are possible in light of the above teachings. Such modifications and variations that may be apparent to a person skilled in the art are intended to be included within the scope of this invention.

What is claimed is:

1. In an image reading apparatus having a housing and a document table which moves reciprocatingly with respect to said housing, there being a home position, an exposure-starting position and an exposure-ending position of said document table separately defined with respect to said housing, the improvement wherein said apparatus further comprises
   an elastic member capable of internally storing energy supplied from outside thereto and attached to said document table such that the amount of energy internally stored by said elastic member increases as said document table is moved from said exposure-ending position to said exposure-starting position and that said elastic member, when said document table is at said home position, has enough energy stored internally therein for moving said document table to said exposure-ending position,
   a controllably retractable stopper for keeping said document table at said home position to thereby prevent dissipation of energy internally stored in said elastic member when said document table is kept at said home position, and
   a damper for causing energy stored in said elastic member to be supplied to said document table at a constant rate.

2. The apparatus of claim 1 wherein said elastic member includes a spiral spring with one end attached to said housing and the other end attached to said document table.

3. The apparatus of claim 1 wherein said damper is affixed to said document table and includes a pinion engaged to a rack attached to said housing.

4. The apparatus of claim 1 wherein said housing contains a plurality of position sensors for detecting the position of said document table with respect to said housing.

5. The apparatus of claim 4 wherein said apparatus further comprises a central processing unit which controls the timing of a copying process according to signals outputted from said position sensors.

6. The apparatus of claim 1 wherein said stopper can assume a protruding position to prevent said document table from moving with respect to said housing even if said elastic member applies restoring force on said document table, tending to move said document table with respect to said housing.

7. The apparatus of claim 6 wherein said stopper can assume a retracted position to allow said document table to move with respect to said housing.

8. The apparatus of claim 1 wherein the distance traveled by said document table for a scan from said exposure-starting position to said exposure-ending position is greater than the distance from said home position to said exposure-starting position.

9. The apparatus of claim 1 further comprising
   a sensor for transmitting a signal when said document table is detected to have moved by a specified distance from said exposure-ending position, and
   a scanner for reading image data by scanning a document set on said document table as said document table returns to said exposure-ending position.

10. The apparatus of claim 9 wherein said scanner is disposed below said document table and includes a light emitting diode, a converging light transmitting medium and a one-dimensional CCD sensor.

11. The apparatus of claim 9 wherein said elastic member includes a spiral spring with one end attached to said housing and the other end attached to said document table.

12. The apparatus of claim 9 wherein said damper causes said document table to return to said exposure-ending position at a constant speed.

13. The apparatus of claim 12 wherein said damper is affixed to said document table and includes a pinion engaged to a rack attached to said housing.

14. The apparatus of claim 9 wherein the distance traveled by said document table for a scan from said exposure-starting position to said exposure-ending position is greater than the distance from said home position to said exposure-starting position.

* * * * *